(12) United States Patent
Ye

(10) Patent No.: US 10,842,304 B2
(45) Date of Patent: Nov. 24, 2020

(54) OBJECT HANGING DEVICE

(71) Applicant: Yi Ye, Guangdong (CN)

(72) Inventor: Yi Ye, Guangdong (CN)

( * ) Notice: Subject to any disclaimer, the term of this patent is extended or adjusted under 35 U.S.C. 154(b) by 0 days.

(21) Appl. No.: 15/314,939

(22) PCT Filed: Jul. 16, 2014

(86) PCT No.: PCT/CN2014/082312
§ 371 (c)(1),
(2) Date: Nov. 29, 2016

(87) PCT Pub. No.: WO2015/188422
PCT Pub. Date: Dec. 17, 2015

(65) Prior Publication Data
US 2017/0188736 A1    Jul. 6, 2017

(30) Foreign Application Priority Data

Jun. 9, 2014   (CN) .................... 2014 2 0303903 U

(51) Int. Cl.
| | | |
|---|---|---|
| *A47G 29/00* | (2006.01) | |
| *A47G 29/087* | (2006.01) | |
| *A47G 25/10* | (2006.01) | |
| *A47G 25/14* | (2006.01) | |
| *A47G 25/00* | (2006.01) | |

(52) U.S. Cl.
CPC ........... *A47G 29/087* (2013.01); *A47G 25/10* (2013.01); *A47G 25/14* (2013.01); *A47G 25/00* (2013.01)

(58) Field of Classification Search
CPC ........ A47G 1/17; A47G 1/175; A47G 1/1606; A47G 1/205; A47G 1/168; F16M 13/02

USPC ..................... 248/205.3, 467, 303
See application file for complete search history.

(56) References Cited

U.S. PATENT DOCUMENTS

| | | | | |
|---|---|---|---|---|
| 4,338,151 A | * | 7/1982 | Hutter, III | B29C 65/7855 156/71 |
| 4,931,805 A | * | 6/1990 | Fisher | H01Q 1/1285 343/713 |
| 4,932,805 A | * | 6/1990 | Mullen | B41J 29/02 403/13 |
| 5,065,489 A | * | 11/1991 | Mullen | B23Q 1/0063 29/281.5 |
| 6,017,176 A | * | 1/2000 | Marui | F16B 37/048 411/258 |

(Continued)

FOREIGN PATENT DOCUMENTS

JP         58117747 U    8/1983

OTHER PUBLICATIONS

International Search Report of PCT Patent Application No. PCT/CN2014/082312 dated Oct. 9, 2014.

*Primary Examiner* — Steven M Marsh

(57) ABSTRACT

Disclosed is an object hanging device, comprising a base (1), wherein a back surface of the base (1) is provided with a soft edge (2) capable of being attached to a hanging surface to be attached, a glue groove for containing glue is enclosed by the soft edge (2), a lug boss (5) is arranged on a front end surface of the base (1), and a glue injection hole (4) extending towards the back surface of the base (1) and being in communication with the glue groove (3) is arranged on the lug boss (5). By arranging the lug boss (5), the glue injection and the bearing of heavy objects are facilitated, and glue can be injected in different environments, so that the adhesion is firm.

15 Claims, 6 Drawing Sheets

(56) References Cited

U.S. PATENT DOCUMENTS

| | | | | |
|---|---|---|---|---|
| 6,105,922 | A * | 8/2000 | Derman | E05B 67/383 |
| | | | | 248/205.3 |
| 7,207,543 | B2 * | 4/2007 | Ortwein | F16B 11/006 |
| | | | | 156/578 |
| 7,833,620 | B2 * | 11/2010 | Enserink | F16B 47/003 |
| | | | | 248/205.3 |
| 2013/0056598 | A1 * | 3/2013 | Ghiorghie | F16B 47/003 |
| | | | | 248/205.3 |

* cited by examiner

OBJECT HANGING DEVICE

TECHNICAL FIELD

The present invention relates to an object hanging device, particularly to an object hanging device attached to a place like wall to hang an object.

BACKGROUND

In order that bags, clothes and other articles can be in a hanging state, typically hooks are pasted on a wall surface or door surface. In prior art, generally, a double faced adhesive tape is pasted on a back surface of a hook and then pasted onto a wall surface or door surface. Using this manner, as the double faced adhesive tape has limited stickiness, it cannot hold a heavy object. Furthermore, if the wall surface is wet or uneven, stickiness will be affected. In another method, the hook is sucked to a wall surface by means of a sucker, but this method requires the wall surface or door surface must be smooth. If the wall surface is wet, dirty or uneven, the hook cannot be attached to the wall.

SUMMARY OF THE INVENTION

The object of the present invention is to overcome the defects of prior art and provide a novel object hanging device that can be easily and firmly pasted.

In order to solve the foregoing problem, the present invention adopts the following technical solution:

A novel object hanging device, comprising a base, wherein a back surface of the base is provided with a soft edge capable of being attached to a hanging surface to be attached, a glue groove for containing glue is enclosed by the soft edge, a lug boss is arranged on a front end surface of the base, and a glue injection hole extending towards the back surface of the base and being in communication with the glue groove is arranged on the lug boss.

A novel object hanging device as mentioned above, wherein the soft edge is provided with an externally communicable opening.

A novel object hanging device as mentioned above, wherein the glue groove is a "U"-shaped or "V"-shaped groove.

A novel object hanging device as mentioned above, wherein a cover block covering the glue injection hole is arranged on the lug boss.

A novel object hanging device as mentioned above, wherein a hook is arranged on the cover block.

A novel object hanging device as mentioned above, wherein internal thread is arranged inside the glue injection hole, and the cover block comprises a threaded convex column extending into the glue injection hole and connected to the internal thread.

A novel object hanging device as mentioned above, wherein external thread is arranged outside the lug boss, a glue chamber for containing glue is arranged inside the cover block, and internal thread is arranged inside the glue chamber.

A novel object hanging device as mentioned above, wherein a front end of the lug boss is provided with a tapered tip capable of puncturing the membrane of the glue chamber.

A novel object hanging device as mentioned above, wherein a bearing block is arranged on the lug boss and between the base and an end surface of the cover block, and a supporting part is arranged on the bearing block.

A novel object hanging device as mentioned above, wherein a surface of the soft edge facing the hanging surface to be attached is an adhesive surface.

Beneficial effects of the present invention:

A soft edge is arranged on a back surface of the base and a glue groove is enclosed by the soft edge. During installation, the right position of the base is found at first, and then the base is pressed down gently. If the position is not right, it may be torn off and re-positioned. Eventually it is pressed by human force. The soft edge is squeezed and attached to a wall surface or door surface. Then glue is injected into a glue groove via a glue injection hole. As the soft edge is squeezed and deformed, the glue inside the glue groove won't spill out from two sides of the soft edge to ensure firm adhesion after solidification of the glue. The lug boss is arranged mainly for facilitating the injection of glue. Meanwhile the lug boss may be used to hang a heavy object and play a role of load bearing; there are two main ways to inject glue into it: (1) the glue injection hole adopts internal thread. During injection of glue, nozzle thread of a tank filled with glue is screwed into a glue injection hole, and then the glue tank is squeezed to inject glue. This way is convenient. In order that the product looks good after glue injection, a cover block may be arranged on the lug boss; (2) a glue chamber is arranged inside a cover block. Glue may be filled into the glue chamber in advance and then the glue chamber is screwed up to a lug boss. During screwing, the glue chamber is squeezed and its space is narrowed. Subsequently, the glue in the glue chamber will flow into a glue injection hole and enter a glue groove. After glue is solidified, the base is fixed. In different environments, glue with different adhesiveness may be adopted to further assure firmness; a bearing block is mounted on a lug boss. A supporting part is arranged on the bearing block. The supporting part may be a hook or a basket for containing objects to facilitate hanging of more objects.

DETAILED DESCRIPTION OF PREFERRED EMBODIMENTS

Figure 1:
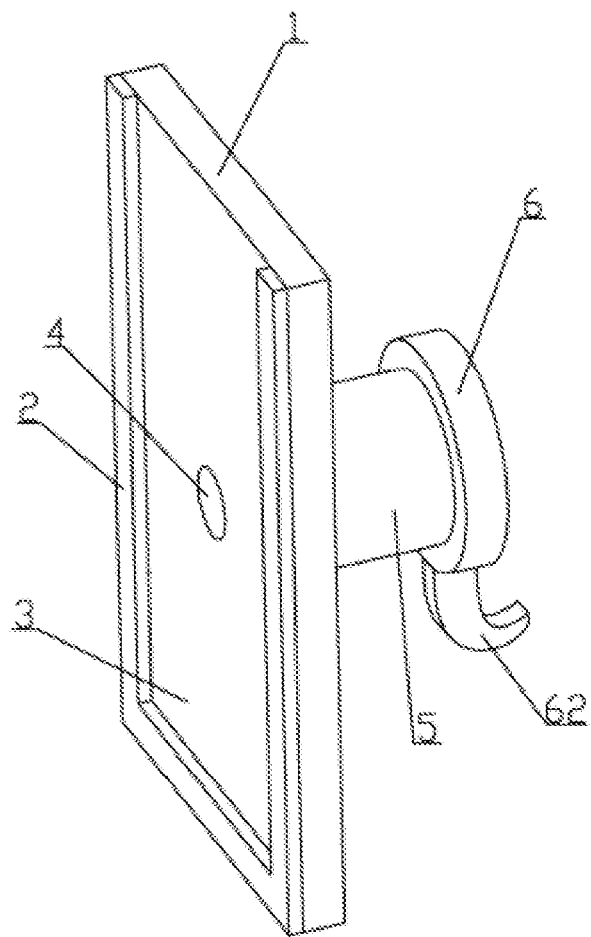
FIG. 1 is a space diagram of Embodiment 1 of the present invention.
Figure 2:
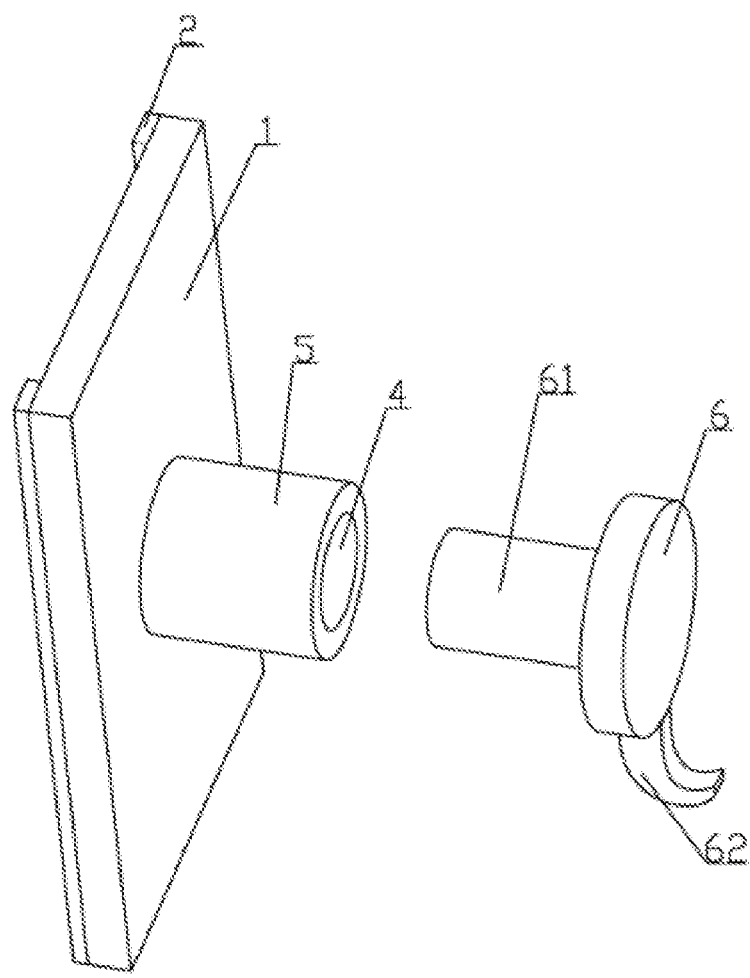
FIG. 2 is an exploded view of Embodiment 1 of the present invention.

Below the present invention is further described by referring to accompanying drawings and embodiments:

Embodiment 1, as shown in FIG. 1 and FIG. 2, provides a novel object hanging device, comprising a base 1, wherein a back surface of the base 1 is provided with a soft edge 2 capable of being attached to a hanging surface to be attached, and a surface of the soft edge 2 facing the surface to be attached is an adhesive surface. A glue groove 3 for containing glue is enclosed by the soft edge 2. The glue groove 3 may be a closed annular groove for example. An externally communicable opening is arranged on the soft edge 2 and face upwards. For example, the glue groove 3 is a "U"-shaped or "V"-shaped groove. A lug boss 5 is arranged on a front end surface of the base 1, and a glue injection hole 4 extending towards the back surface of the base 1 and being in communication with the glue groove 3 is arranged on the lug boss 5. A cover block 6 covering the glue injection hole 4 is arranged on the lug boss 5. A hook 62 is arranged on the cover block 6. Internal thread is arranged inside the glue injection hole 4, and a threaded convex column 61 extending into the glue injection hole 4 and connected to it in a threaded manner is arranged on the cover block 6. During injection of glue, a nozzle of a glue tank is screwed into the glue injection hole 4. Then the glue tank is squeezed to push glue into the glue groove 3. After glue is injected, the cover block 6 is screwed onto the lug boss 5 and the glue injection hole 4 is blocked. The hook 62 on the cover block 6 may play a role in hanging an object. Different glue is used in different occasions to ensure firm adhesion.

Figure 3:
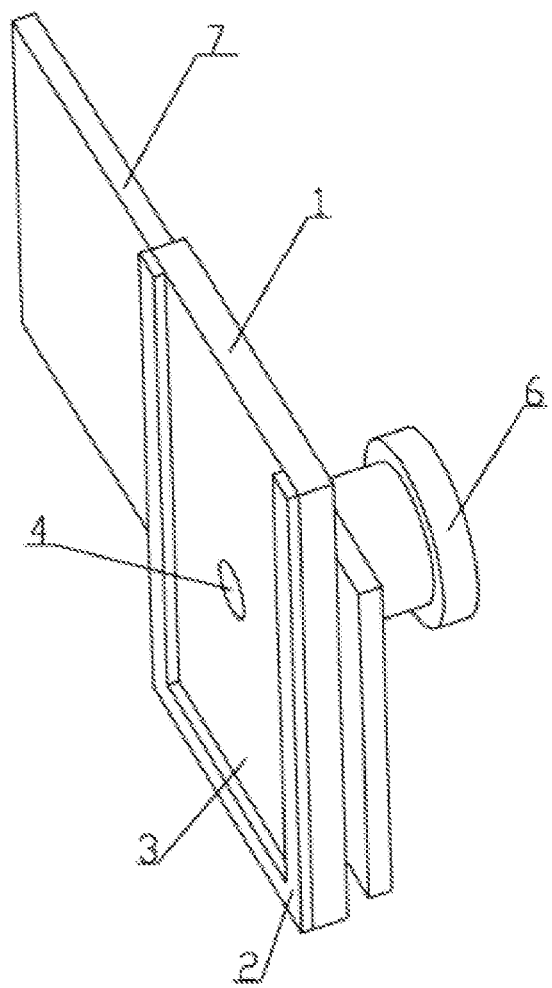
FIG. 3 is a space diagram of Embodiment 2 of the present invention.
Figure 4:
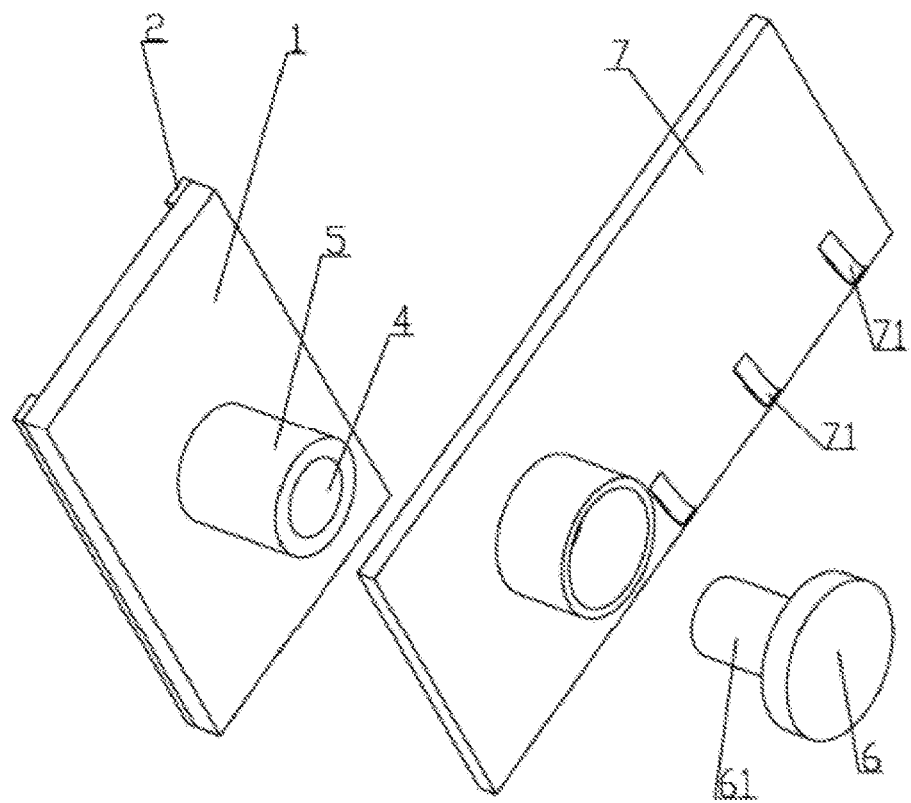
FIG. 4 is an exploded view of Embodiment 2 of the present invention.
Figure 5:
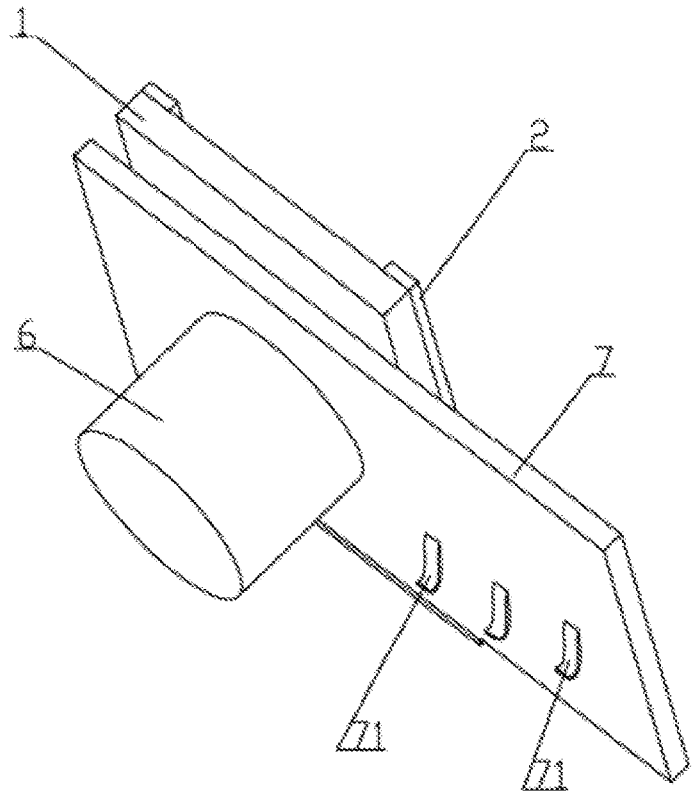
FIG. 5 is a space diagram of Embodiment 3 of the present invention.
Figure 6:
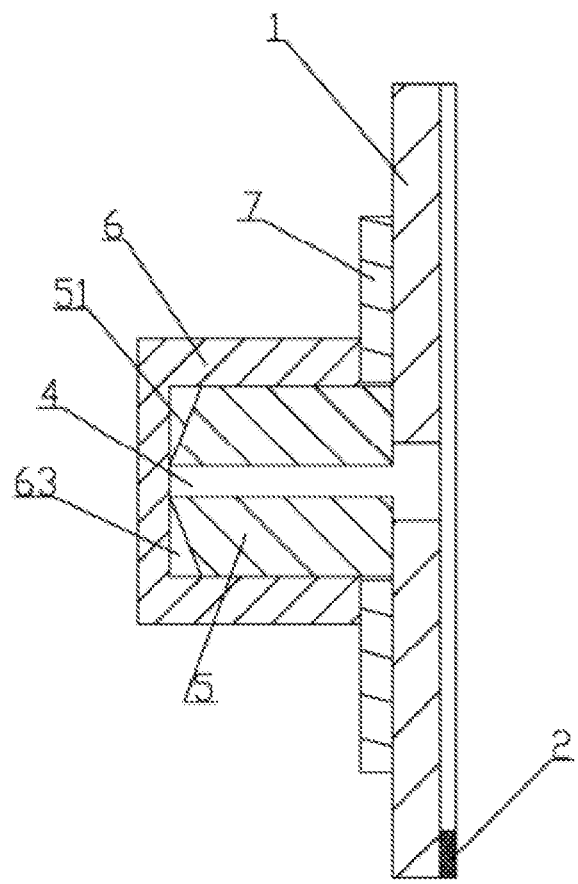
FIG. 6 is a section view of Embodiment 3 of the present invention.
Figure 7:
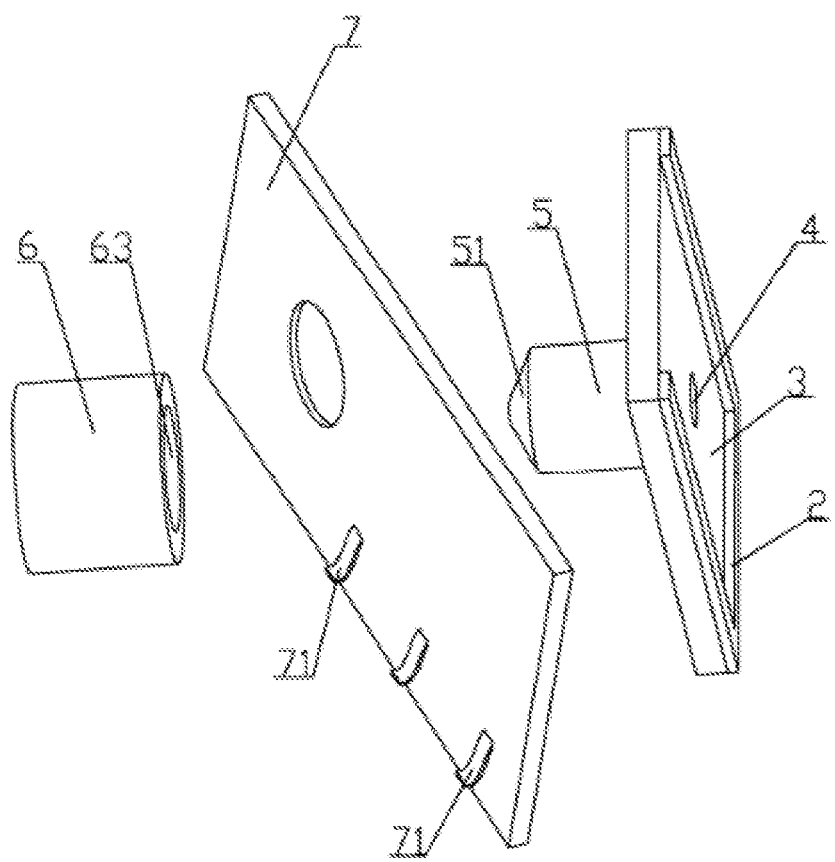
FIG. 7 is an exploded view of Embodiment 3 of the present invention.

Embodiment 2, as shown in FIG. 3 and FIG. 4, has the following difference from Embodiment 1: no hook 62 is arranged on a cover block 6. Instead, a bearing block 7 is arranged on a lug boss 5 and between a base 1 and an end surface of a cover block 6. A supporting part 71 is arranged on the bearing block 7. The bearing block 7 is fixed and positioned via an end surface of the cover block 6. After the cover block 6 is put on, an end surface of the cover block 6 clings to an annular lug boss on the bearing block 7. The supporting part 71 may be a hook or a hanging basket in order to hang more objects.

Embodiment 3, as shown in FIG. 4~FIG. 7, has the following difference from Embodiment 2: external thread is arranged outside a lug boss 5, a glue chamber for containing glue 63 is arranged inside a cover block 6, internal thread is arranged on the inner wall of the glue chamber 63, and glue is filled into the glue chamber 63 through a membrane in advance. A tapered tip 51 capable of puncturing a membrane of the glue chamber 63 is arranged at a front end of the lug boss 5 and is used to puncture the membrane. During injection of glue, the cover block 6 is screwed onto the lug boss 5. During screwing, the glue chamber 63 is squeezed and its space is narrowed and the glue in the glue chamber 63 will flow into the glue injection hole 4 and enter the glue groove 3. After injection of glue in this way, heavy objects may be supported by a bearing block 7. In other words, a bearing block is arranged on the lug boss 5 and between the base 1 and an end surface of the cover block 6. When the bearing block 7 is adopted, after the cover block 6 is put on, an end surface of the cover block 6 will clings to an end surface of the bearing block 7. In addition, a hook may also be arranged on the cover block 6.

The invention claimed is:

1. A novel object hanging device, comprising a base (1), wherein a back surface of the base (1) is provided with a soft edge (2) capable of being attached to a hanging surface to be attached; a glue groove (3) for containing glue being enclosed by the soft edge (2);

a lug boss (5) being arranged on a front end surface of the base (1); and a glue injection hole (4) extending towards the back surface of the base (1) and being in communication with the glue groove (3) is arranged on the lug boss (5);

wherein a cover block (6) covering the glue injection hole (4) is arranged on the lug boss (5);

an external thread being arranged outside the lug boss (5); a glue chamber for containing glue being arranged inside the cover block (6); an internal thread being arranged inside the glue chamber (63).

2. The novel object hanging device according to claim 1, wherein the soft edge (2) is provided with an externally communicable opening.

3. The novel object hanging device according to claim 2, wherein the glue groove (3) is a "U"-shaped or "V"-shaped groove.

4. The novel object hanging device according to claim 1, wherein a hook (62) is arranged on the cover block (6).

5. The novel object hanging device according to claim 1, wherein a front end of the lug boss (5) is provided with a tapered tip (51) capable of puncturing a membrane of the glue chamber (63).

6. The novel object hanging device according to claim 1, wherein a bearing block (7) is arranged on the lug boss (5) and between the base (1) and an end surface of the cover block (6); a supporting part (71) being arranged on the bearing block (7).

7. The novel object hanging device according to claim 1, wherein a surface of the soft edge (2) facing the hanging surface to be attached is an adhesive surface.

8. The novel object hanging device according to claim 2, wherein a cover block (6) covering the glue injection hole (4) is arranged on the lug boss (5).

9. The novel object hanging device according to claim 8, wherein a hook (62) is arranged on the cover block (6).

10. The novel object hanging device according to claim 8, wherein internal thread is arranged inside the glue injection hole (4); the cover block (6) comprising a threaded convex column (61) extending into the glue injection hole (4) and connected to the internal thread.

11. The novel object hanging device according to claim 8, wherein external thread is arranged outside the lug boss (5); a glue chamber for containing glue being arranged inside the cover block (6); internal thread being arranged inside the glue chamber (63).

12. The novel object hanging device according to claim 11, wherein a front end of the lug boss (5) is provided with a tapered tip (51) capable of puncturing a membrane of the glue chamber (63).

13. The novel object hanging device according to claim 10, wherein a bearing block (7) is arranged on the lug boss (5) and between the base (1) and an end surface of the cover block (6); a supporting part (71) being arranged on the bearing block (7).

14. The novel object hanging device according to claim 11, wherein a bearing block (7) is arranged on the lug boss (5) and between the base (1) and an end surface of the cover block (6); a supporting part (71) being arranged on the bearing block (7).

15. The novel object hanging device according to claim 1, wherein a bearing block (7) is arranged on the lug boss (5) and between the base (1) and an end surface of the cover block (6); a supporting part (71) being arranged on the bearing block (7).

* * * * *